UNITED STATES PATENT OFFICE.

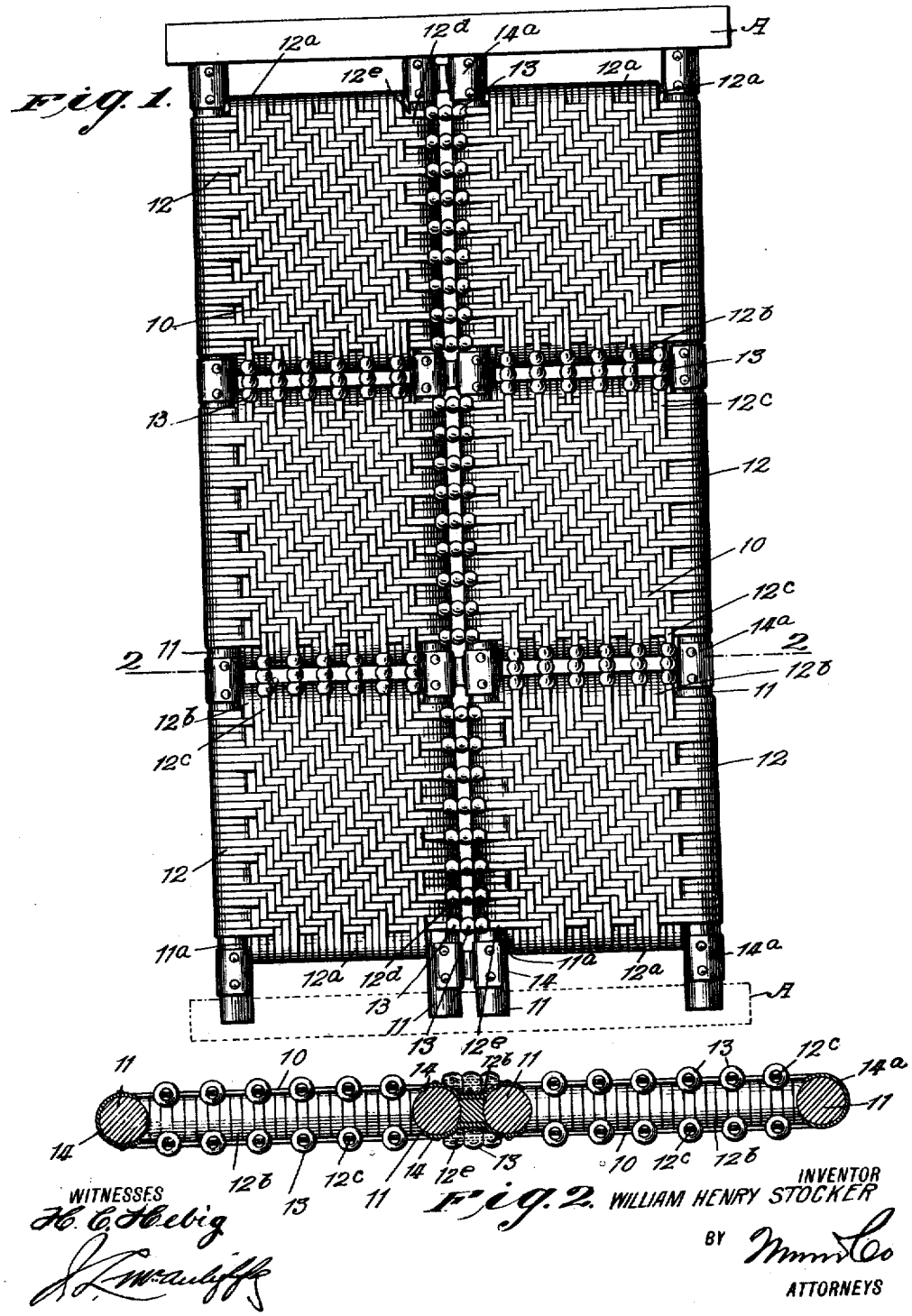

WILLIAM HENRY STOCKER, OF PHILADELPHIA, PENNSYLVANIA.

WICKER PANEL.

1,349,477.  Specification of Letters Patent.  Patented Aug. 10, 1920.

Application filed February 10, 1920. Serial No. 357,647.

*To all whom it may concern:*

Be it known that I, WILLIAM HENRY STOCKER, a citizen of the United States, and a resident of Philadelphia, in the county of Philadelphia and State of Pennsylvania, have invented a new and Improved Wicker Panel, of which the following is a description.

My invention relates to panels of ratan, reed, willow, or like materials, and is adapted to be variously employed in the construction of furniture such as tables, chairs, or rocking chairs for example, or in building up walls or portions of walls.

The general object of the invention is to provide a panel embodying frame elements, and woven areas so coördinated with the frame elements and with one another that the panel will be strong and durable and will possess esthetic attributes to a high degree.

The nature of the invention as well as its advantages will clearly appear from the specific description hereinafter given.

Reference is to be had to the accompanying drawings, it being understood that the drawings are merely illustrative of one example of the invention.

Figure 1 is a front view of a panel embodying my invention;

Fig. 2 is a cross section on the line 2—2 Fig. 1.

For the purpose of illustration, I have shown a panel formed of two sections each having its individual framework and individual woven areas, the woven areas of each section being interwoven with one another and the woven areas of the one section being interwoven with those of the adjacent section. In producing a panel in accordance with my invention, a plurality of woven areas 10 are produced made of ratan or similar material, woven on to a frame consisting of longitudinal bars 11 and transverse bars 11$^a$, there being in the example given for illustration, two longitudinal series of separate woven areas 10, each series being woven onto a pair of longitudinal bars 11 united by a plurality of cross bars 11$^a$. Connection between adjacent longitudinal bars 11 of adjacent sections is effected in any suitable manner, preferably by metallic connecting plates 14 at the back and front of the panel, there being suitable ornamental metallic elements 14$^a$ on the outer side bars 11 in the preferred form of the invention, said metallic elements and connecting members serving to cover more or less of the frame bars left exposed by the woven material.

The woven areas 10 of each panel section are produced as follows: The transverse strands at the outer sides of the panel, that is to say, at the sides where there is no adjacent panel section, are all returned about the outer longitudinal frame bars 11 as indicated at 12, and continued to the opposite side of the panel, there being a woven area thus produced at each side. Also, at the top and bottom of an area 10 the longitudinal strands are returned about the top and bottom cross bars 11$^a$ as indicated at 12$^a$, and continued to the opposite sides of the panel. At adjacent ends of the woven areas 10 of a panel section, the majority of the longitudinal strands of ratan or other material are returned about the adjacent cross bars 11$^a$ as indicated at 12$^b$, and in order to effect an interweaving of adjacent areas 10 of each panel section, certain longitudinal strands of the ratan or other material are carried from one woven area to the adjacent woven area as indicated at 12$^c$ and interwoven with both. Similarly, the majority of the transverse woven strands of adjacent woven areas of adjacent panel sections are returned about the adjacent longitudinal bars 11 of the respective panel sections as indicated at 12$^d$, while the remaining transverse strands of adjacent areas of the respective sections of panel sections are carried across from one woven area to another as indicated at 12$^e$ and interwoven with both adjacent areas.

By the described arrangement it will be seen that the woven material forms a tie between the woven areas of a given panel section and between adjacent woven areas of adjacent panel sections. The arrangement results in a strong construction and contributes materially to the esthetic effect of the panel. If desired, the longitudinal and transverse connecting strands 12$^c$ and 12$^e$ may have ornamental elements such as beads or the like strung thereon as at 13. The letter A in full lines at the top of Fig. 1 and in dotted lines at the bottom of said figure represent temporary frame members in which the terminals of the longitudinal bars 11 are mortised while the weaving is done, said strips being removed when the panel is finished.

My improved panel may be variously employed in forming built-up wall panels or in articles of furniture as for example on the several sides of a table, beneath the top thereof, or at the sides of a chair or rocking chair, and will contribute to the strength as well as to the ornamental appearance of the article to which the panels are applied.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A panel of the class described including a plurality of sections, each presenting longitudinal frame bars and transverse frame bars, and woven material forming separate woven areas in each panel section, some of the strands of each section running to and being interwoven with the other areas of the section and other strands of the separate areas of the section running to and being interwoven with the areas of the other section.

2. A panel of the class described including a frame presenting adjacent parallel members and woven material thereon, presenting a plurality of separate woven areas, the woven material being returned about the frame members and woven at opposite sides of the panel, and certain of the strands, less than the total number of one area extending across adjacent frame members and interwoven with the strands of an adjacent woven area.

3. A panel of the class described including a frame presenting longitudinal bars and a plurality of transverse bars together with woven material on said frame, the woven material presenting separate and distinct areas and certain of the strands of said material being carried across the transverse bars from one woven area to another and interwoven with both.

4. A panel of the class described comprising separate sections, each presenting longitudinal frame bars and transverse frame bars, and woven material in the form of separate areas in each section and certain strands of the woven material being interwoven with the strands in the respective areas of each section and others interwoven in the areas of adjacent sections; together with additional rigid connecting means between the adjacent frame bars of adjacent sections.

5. A panel of the class described comprising separate sections, each presenting longitudinal frame bars and transverse frame bars, and woven material in the form of separate areas in each section and certain strands of the woven material being interwoven in the respective areas of each section and other strands of the respective areas of the sections being interwoven in the areas of adjacent sections; and covering elements on the longitudinal bars of the frame between the woven areas.

6. A panel of the class described including frame bars together with woven material thereon, the woven material presenting separate areas and certain of the strands thereof less than the total number being carried across adjacent bars from one woven area to another and interwoven with both.

7. A panel of the class described including frame bars together with woven material thereon, the woven material presenting separate areas and certain of the strands thereof less than the total number being carried across adjacent bars from one woven area to another and interwoven with both; together with ornamental elements strung on the said strands between adjacent woven areas.

WILLIAM HENRY $\overset{\text{his}}{\times}$ STOCKER.
$\phantom{WILLIAM HENRY}_{\text{mark}}$